May 28, 1946.  K. WILFERT ET AL  2,401,209
VEHICLE SUSPENSION
Filed Jan. 17, 1941
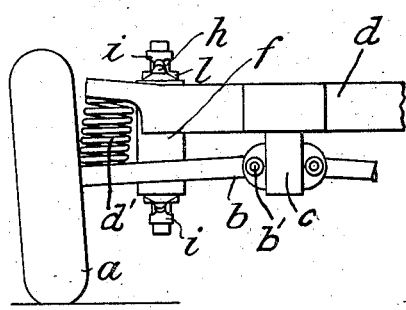
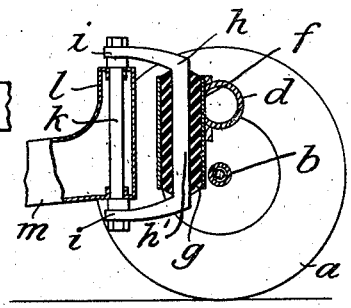
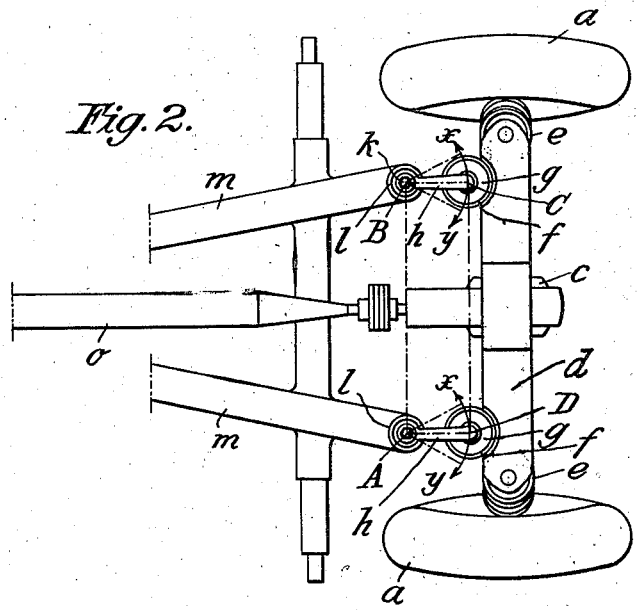
INVENTORS:
KARL WILFERT
BELA BARENYI Patented May 28, 1946

2,401,209

UNITED STATES PATENT OFFICE 2,401,209

VEHICLE SUSPENSION

Karl Wilfert, Sindelfingen, and Béla Barényi, Boblingen, Germany; vested in the Alien Property Custodian Application January 17, 1941, Serial No. 374,842
In Germany January 24, 1940

21 Claims. (Cl. 280—106.5)

The present invention relates to a resilient connection of a wheel suspension to the frame of a vehicle, particularly for vehicles provided with half axles. The invention substantially consists in this that independently of the main spring-suspension of the wheels, the wheel suspension or the axle can yield substantially transversely to the direction of drive as well as upwardly, i. e. in a direction vertically or inclined to the road-way. However, in another direction there is not any or only a slight resiliency with regard to the frame or to the body of the vehicle.

In connection with wheel suspensions in which the wheels during deflecting of the springs are subjected to alterations of the gage, particularly therefore in connection with so-called oscillating half axles, shocks vertically as well as transversely directed to the direction of drive occur in the joints of the oscillating half axles which result from the fact that the point of contact of the wheel with the road surface tends to change its distance from the centre longitudinal plane of the vehicle.

According to the invention these shocks, acting substantially in a vertical and also in a transverse direction to the direction of drive, are intercepted and absorbed before they may be transferred to the frame. Simultaneously resiliency in another direction is rendered as small as possible to exclude a tendency of the vehicle towards floating and to avoid if possible indefinite movements of the axle relatively to the frame.

In suitable adaptation to the forces occurring and to the conditions of movement, the resiliency transversely of the direction of drive preferably is greater than the upwardly directed resiliency in such a manner that the first mentioned resiliency corresponds completely or substantially completely to the alteration of the gage of the vehicle. The resiliency in a transverse direction as well as in an upward direction is obtained by the same elastic buffers which are arranged between the frame of the vehicle on the one hand and a supporting member for the axle or the wheel suspension on the other hand, while the main spring-suspension of the wheels preferably is mounted between the wheel or a member oscillating with the wheel and the supporting member.

The invention furthermore consists in this that, for the purpose of obtaining a resiliency of the axle or the wheel suspension in a transverse direction and in a vertical direction, a mechanism, preferably a link parallelogram swingably arranged substantially in a horizontal plane and subjected to the action of a spring is provided which serves to guide the wheel suspension or the axle. The resiliency of the link parallelogram is obtained by spring members subjected to torsional stress and mounted in the joints of this link parallelogram. For instance it is possible to use spiral springs or torsion bars. A particular advantageous arrangement is the employment of rubber sleeves arranged in the joints of the link parallelogram, preferably in the joints connecting the links to the member supporting the wheel suspension or the axle. The rubber buffers are subjected to thrust stresses for the purpose of obtaining a vertical resiliency and to torsional stresses for the purpose of obtaining a transverse resiliency of the axle.

By the use of such a link parallelogram, the forces occurring may be controlled in a particularly suitable manner, because the vertical forces act in the direction of the axis of the pivots of the links and are absorbed in a particularly convenient and reliable manner by the bearings of the pivots of the links or by the rubber sleeves respectively. Simultaneously the link parallelogram allows a kinematic positive guidance of the axle transversely to the longitudinal direction of the frame of the vehicle. It is possible that the pivots of the links on the vehicle may have an inclination in a vertical plane in the direction of the drive.

In the accompanying drawing one construction according to the invention is shown by way of example.

In this drawing:

Fig. 1 shows a side elevation of the axle according to the invention,

Fig. 2 is a plan view of this construction, and

Fig. 3 shows a rear elevation of same.

The wheels are mounted upon oscillating half axles $b$ which are laterally linked to a differential gear $c$ by means of pivots $b'$. The differential gear $c$ is fixed to a transversely arranged intermediate supporting member $d$ against the ends of which bear the not guided coiled springs $d'$ serving as a main spring-suspension of the wheels.

Welded or in other suitable manner fixed to the supporting member $d$ are metal sleeves $f$. In the latter rubber sleeves $g$ are mounted the outer surfaces of which are preferably biased to a certain degree and connected in a strongly adherent manner to the metal sleeves $f$ and the inner surfaces to the pivot like centre portion $h'$ of a U-shaped link $h$. Passed through the outer ends $i$ of each link $h$ is a vertical supporting pivot $k$ which is journalled in the upwardly bent rear end $l$ of a tube-like longitudinal beam $m$ of the chassis.

To drive the wheels a cardan shaft $o$ is used which for instance is driven by a motor arranged in front.

As may be seen from Fig. 2, the chassis together with the two links $h$ and the supporting member $d$ forms a link parallelogram A—B—C—D swingably arranged in the horizontal plane. With upwardly directed shocks the rubber sleeves $g$ are subjected to thrust stresses, whereas with shocks, acting in a transverse direction, the rubber sleeves $g$ are torsionally stressed. The links swing about the joint points A and B respectively in the directions of the arrow $x$ or $y$ respectively to the right- or left hand side of drive, whereby they correspondingly guide in parallel the axles. Consequently during deflecting of the springs of the wheel and the alterations of the gage the axle may laterally give way with regard to the chassis of the vehicle without the chassis of the vehicle participating in this lateral movement. Shocks and vibrations occurring at the chassis are hereby avoided.

Having now particularly described and ascertained the nature of our said invention and in what manner the same is to be performed we declare that what we claim is:

1. In a vehicle, a chassis, a pair of vehicle wheels, an intermediate member, mounting means between the wheels and intermediate member for mounting the wheels for movement in a substantially vertical direction relatively to the intermediate member, a U-shaped link on each side of the central longitudinal plane of the vehicle, said link extending substantially in the longitudinal direction of the vehicle, and means for pivotally connecting each link with the chassis on the one hand and the intermediate member on the other hand so that the said link permits a yielding of the intermediate member relatively to the chassis substantially transversely to the direction of travel of the vehicle.

2. The combination according to claim 1, in which the chassis, the intermediate member, the two links and the pivotal connecting means form a yieldable link-parallelogram lying in a substantially horizontal plane.

3. The combination according to claim 1, in which the means for connecting the links with the chassis and intermediate member include twistable spring means opposing a transverse shifting of the intermediate member relatively to the chassis.

4. The combination according to claim 1, in which the means for connecting the links with the chassis and intermediate member include twistable rubber bushes having substantially perpendicular axes, opposing a transverse shifting of the intermediate member relatively to the chassis by torsional action.

5. The combination according to claim 1, in which the intermediate member carries a drive housing, and means for driving the wheels from said drive housing.

6. The combination according to claim 1, in which the means connecting the links with the intermediate member include a connection yieldable in the vertical direction.

7. In a vehicle having a frame, a pair of vertically spaced bearings on each side of said frame, a U-shaped link on each side of said frame journaled in the respective bearings, a transverse member yieldably and rotatably supported by the two links, wheel supporting axles, and means for springing said axles relatively to said intermediate member.

8. The combination according to claim 7, in which said frame, link, transverse member and their connecting means form a parallelogram movable in the transverse direction of said vehicle.

9. The combination according to claim 7, in which said frame, link, transverse member and their connecting means form a parallelogram movable in the transverse direction of said vehicle, and in which at least two of the joints of said parallelogram include resilient members subject to torsional stress upon movement of the parallelogram in the transverse direction.

10. The combination according to claim 7, in which said frame, link, transverse member and their connecting means form a parallelogram movable in the transverse direction of said vehicle, and in which at least two of the joints of said parallelogram include rubber sleeves subject to torsional stress upon movement of the parallelogram in the transverse direction.

11. The combination according to claim 7, in which said frame, link, transverse member and their connecting means form a parallelogram movable in the transverse direction of said vehicle, and in which at least two of the joints of said parallelogram include twistable rubber sleeves subject to torsional stress upon movement of the parallelogram in the transverse direction in combination with a drive housing mounted on said transverse member, and drive shafts from said drive housing to said wheel.

12. The combination according to claim 1, in which the wheel mounting means are formed by swinging half-axles.

13. The combination according to claim 1, in which the chassis, guide links, intermediate member and the pivotal connecting means form a parallelogram movable in the transverse direction of said vehicle, and in which the mounting means for the wheels comprise swinging half-axles.

14. The combination according to claim 7, in which said frame, links, transverse member and their connecting means form a parallelogram movable in the transverse direction of said vehicle, in which at least two of the joints of said parallelogram include resilient members subject to torsional stress upon movement of the parallelogram in the transverse direction, and in which said axles are formed as swinging half-axles.

15. The combination according to claim 1, in which the means for connecting the links with the chassis and intermediate member includes twistable rubber bushes having substantially perpendicular axes, opposing a transverse shifting of the intermediate member relatively to the chassis by torsional action, and in which the wheel mounting means are formed by swinging half-axles, in combination with means for springing the half-axles relatively to said intermediate member.

16. The combination according to claim 7, in which the connection between said links and transverse member is formed by resilient rubber bushings, said frame, links, transverse member and their connecting means forming a parallelogram movable in the transverse direction of said vehicle, in combination with a drive housing on said transverse member and drive shafts connecting said drive housing with said wheels.

17. The combination according to claim 1, in which the means for connecting the links with the chassis and intermediate member include twistable rubber bushes having substantially perpendicular axes, opposing a transverse shifting of the intermediate member relatively to the chassis by torsional action, while permitting a yieldable movement in their axial direction.

18. The combination according to claim 1, in which the wheel mounting means are formed by swinging half-axles, in combination with spring means springing said half-axles relatively to said intermediate member.

19. The combination according to claim 1, in which each link is formed in the shape of a U whose base extends vertically to form a bearing trunnion, while the outer ends of each leg are formed as pivot journals.

20. The combination according to claim 1, in which each link is formed as a U the base of which extends vertically and serves as a bearing trunnion, while the outer ends of each leg of the U are formed as pivot journals, and in which the means for connecting the links with the chassis and intermediate member include twistable rubber bushings with substantially perpendicular axes, enclosing the perpendicular base of the U-shaped link member and opposing a transverse shifting of the intermediate member relatively to the chassis by torsional action.

21. The combination according to claim 1, in which each link is formed as a U, the base of which extends vertically and is formed as a bearing trunnion, while the outer ends of each leg are formed as pivot journals connected to the chassis, and in which the means for connecting each link to the intermediate member include a twistable rubber bush with a substantially perpendicular axis, enclosing the perpendicular base of the U-shaped link member and rigidly attached on the outside to said intermediate member.

KARL WILFERT.
BÉLA BARÉNYI.